(12) United States Patent
Martin (10) Patent No.: US 10,796,541 B1
(45) Date of Patent: Oct. 6, 2020

(54) VIRTUAL REALITY HAPTIC FEEDBACK SYSTEM AND COMPONENTS THEREOF

(71) Applicant: Kipling Martin, Aurora, CO (US)

(72) Inventor: Kipling Martin, Aurora, CO (US)

(*) Notice: Subject to any disclaimer, the term of this patent is extended or adjusted under 35 U.S.C. 154(b) by 0 days.

(21) Appl. No.: 16/452,422

(22) Filed: Jun. 25, 2019

(51) Int. Cl.
| | |
|---|---|
| *H04B 7/06* | (2006.01) |
| *G08B 6/00* | (2006.01) |
| *G06F 3/14* | (2006.01) |
| *B63C 11/22* | (2006.01) |
| *E04H 4/00* | (2006.01) |
| *B63C 11/12* | (2006.01) |

(52) U.S. Cl.
CPC ............... *G08B 6/00* (2013.01); *B63C 11/12* (2013.01); *B63C 11/22* (2013.01); *E04H 4/00* (2013.01); *E04H 4/0006* (2013.01); *G06F 3/14* (2013.01)

(58) Field of Classification Search
None
See application file for complete search history.

(56) References Cited

U.S. PATENT DOCUMENTS

| | | | | |
|---|---|---|---|---|
| 5,490,784 A | * | 2/1996 | Carmein | A63B 22/02 434/29 |
| 5,846,134 A | * | 12/1998 | Latypov | A63B 19/04 463/46 |
| 6,563,489 B1 | * | 5/2003 | Latypov | G09B 9/00 345/164 |
| 8,009,022 B2 | * | 8/2011 | Kipman | G06F 3/011 340/407.1 |
| 8,487,749 B2 | * | 7/2013 | Borrel | G06F 3/016 340/407.1 |
| 9,573,068 B1 | * | 2/2017 | Martin | A63G 31/16 |
| 9,770,203 B1 | * | 9/2017 | Berme | G09G 3/003 |
| 10,528,151 B1 | * | 1/2020 | Keller | G06F 3/017 |
| 2019/0244537 A1 | * | 8/2019 | Liberatore | G02B 27/017 |
| 2020/0089313 A1 | * | 3/2020 | Himane | G06F 3/011 |

* cited by examiner

*Primary Examiner* — Julie B Lieu
(74) *Attorney, Agent, or Firm* — The Iwashko Law Firm, PLLC; Lev Ivan Gabriel Iwashko (57) ABSTRACT

A virtual reality haptic feedback system to simulate a virtual reality experience for a user, the virtual reality haptic feedback system including a chamber to receive the user therein, a wearable haptic feedback device to be worn by the user to provide a haptic experience to at least a portion of a body of the user, and a movement system having a first portion connected to at least a portion of the chamber and removably connected to the wearable haptic feedback device at a second portion to move the wearable haptic feedback device in response to the simulation.

17 Claims, 6 Drawing Sheets

VIRTUAL REALITY HAPTIC FEEDBACK SYSTEM AND COMPONENTS THEREOF

BACKGROUND

1. Field

The present general inventive concept relates generally to a haptic feedback system, and particularly, to a virtual reality haptic feedback system, and components thereof.

2. Description of the Related Art

Virtual reality (VR) is a simulated experience that allows a user to be immersed in an alternate environment different from the real world. VR applications include entertainment and/or educational purposes.

Currently, VR systems use a headset to expose the user to a generated environment using at least images and sounds. However, other experiences include additional sensory exposure, such as smell and touch, using haptic feedback. As such, VR systems are capable of creating a highly interactive environment, such that the user cannot distinguish the simulation from the real world.

Most VR systems are either confined to the user sitting or standing with respect to the ground. As such, current VR experiences do not provide the user a swimming environment or a flying environment.

U.S. Pat. No. 9,573,068 provides a fluid tight chamber to simulate swimming or flying for the user, while the user is suspended in a harness. The chamber also includes multiple ports on each wall to create flow directions of fluid within the chamber to simulate movement for the user. However, movement of the user is limited based on the directions of fluid flow within the chamber.

Therefore, there is a need for a virtual reality system that can allow the user to experience swimming and/or flying with a wide range of movement.

SUMMARY

The present general inventive concept provides a virtual reality haptic feedback system, and components thereof.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a virtual reality haptic feedback system to simulate a virtual reality experience for a user, the virtual reality haptic feedback system including a chamber to receive the user therein, a wearable haptic feedback device to be worn by the user to provide a haptic experience to at least a portion of a body of the user, and a movement system having a first portion connected to at least a portion of the chamber and removably connected to the wearable haptic feedback device at a second portion to move the wearable haptic feedback device in response to the simulation.

The chamber may include a main body to store water therein, and a plurality of turbines to move the water in a first lateral direction or a second lateral direction based on the simulation.

The chamber may further include a plurality of entrapment members to prevent the user from contacting the plurality of turbines.

The main body may be substantially oval shaped.

A speed of flow of the water in the main body may increase or decrease in response to a speed of rotation of the plurality of turbines.

The wearable haptic feedback device may include an air tube disposed on at least a portion of the wearable haptic feedback device to facilitate breathing under the water in the main body.

The wearable haptic feedback device may include a helmet controller disposed on or within at least a portion of the wearable haptic feedback device to display the virtual reality experience to at least one eye of the user.

The movement system may include at least one extension device, including a piston that telescopically reduces in length in a first direction and increases in length in a second direction, a ball joint disposed on a first end of the piston to at least partially rotate at an angle with respect to the chamber, such that the wearable haptic feedback device tilts in response to the rotation of the ball joint, and a controller disposed on at least a portion of an outer surface of the chamber at a second end of the piston to move at least one of the piston and the ball joint in response to the simulation.

The wearable haptic feedback device may be suspended by the piston in response to the user entering the chamber.

The virtual reality haptic feedback system may further include a control unit via an app that manipulates the simulation of the virtual reality experience for the user.

The movement system may at least partially move in response to at least one command from the control unit.

The haptic experience may be a pressured sensation to the user.

The foregoing and/or other features and utilities of the present general inventive concept may also be achieved by providing a virtual reality haptic feedback system to simulate a virtual reality experience for a user, the virtual reality haptic feedback system may include a chamber to receive the user therein, a processor to generate the simulation of the virtual reality experience, and a wearable haptic feedback device to be worn by the user to receive the generated simulation from the processor and provide at least one of a visual experience and a haptic experience for the user based on the received simulation.

The virtual reality haptic feedback system may further include a movement system having a first portion connected to at least a portion of the chamber and removably connected to the wearable haptic feedback device at a second portion to move the wearable haptic feedback device in response to the simulation.

The movement system may move the wearable haptic feedback device in at least one of at least one vertical direction and at least one titled direction in response to the simulation.

The chamber may be oval shaped, and water stored therein may provide a haptic experience.

The simulation may be based on a flow of the water and movement by the movement system.

The foregoing and/or other features and utilities of the present general inventive concept may also be achieved by providing a method of simulating a virtual reality experience for a user disposed within at least a portion of a virtual reality haptic feedback system, the method may include generating the simulation of the virtual reality experience within a processor, transmitting the generated simulation from the processor to a wearable haptic feedback device, and generating within at least a portion of the wearable haptic feedback device, at least one of a visual experience and a haptic experience for the user based on the received simulation.

The method may further include moving the user in at least one direction in response to the simulation and based on a connection of the wearable haptic feedback device to a movement system that responds to the simulation.

BRIEF DESCRIPTION OF THE DRAWINGS

These and/or other features and utilities of the present generally inventive concept will become apparent and more readily appreciated from the following description of the embodiments, taken in conjunction with the accompanying drawings of which.

DETAILED DESCRIPTION

Various example embodiments (a.k.a., exemplary embodiments) will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

List of Components
Virtual Reality Haptic Feedback System 100
Chamber 110
Main Body 111
Entry Portion 111*a*
Entry Door 111*a*1
Turbine Portion 111*b*
Turbines 112
Entrapment Members 113
Fluid Door 114
Lights 115
Movement System 120
First Extension Device 121
First Controller 121*a*
First Piston 121*b*
First Ball Joint 121*c*
Second Extension Device 122
Second Controller 122*a*
Second Piston 122*b*
Second Ball Joint 122*c*
Third Extension Device 123
Third Controller 123*a*
Third Piston 123*b*
Third Ball Joint 123*c*
Fourth Extension Device 124
Fourth Controller 124*a*
Fourth Piston 124*b*
Fourth Ball Joint 124*c*
Wearable Haptic Feedback Device 130
Torso Portion 131
Arm Portions 132
Pelvic Portion 133
Leg Portions 134
Helmet 135
Air Tube 135*a*
Helmet Controller 136
Processing Unit 136*a*
Display Unit 136*b*
Communications Unit 136*c*
Storage Unit 136*d*
Control Unit 140
Input Unit 141
Display Unit 142
Processing Unit 143
Communications Unit 144
Storage Unit 145

Figure 1:
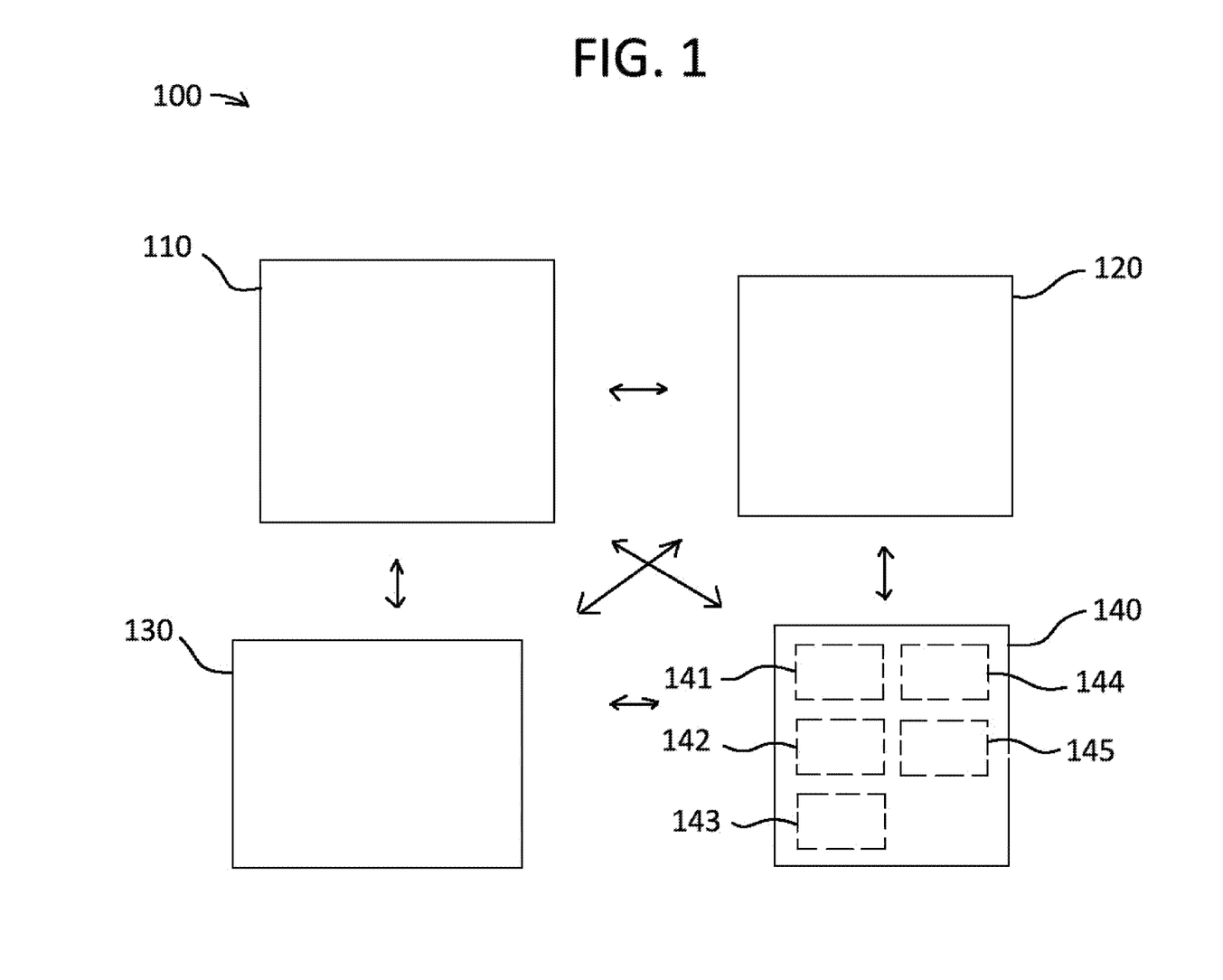
FIG. 1 illustrates a plan view of a virtual reality haptic feedback system, according to an exemplary embodiment of the present general inventive concept.

FIG. 1 illustrates a plan view of a virtual reality haptic feedback system 100, according to an exemplary embodiment of the present general inventive concept.

The virtual reality haptic feedback system 100 may be constructed from at least one of metal, plastic, wood, glass, and rubber, etc., but is not limited thereto. Additionally, the virtual reality haptic feedback system 100 may be highly durable and capable of withstanding high temperatures and/or high pressures.

The virtual reality haptic feedback system 100 may include a chamber 110, a movement system 120, a wearable haptic feedback device 130, and a control unit 140, but is not limited thereto.

Figure 2A:
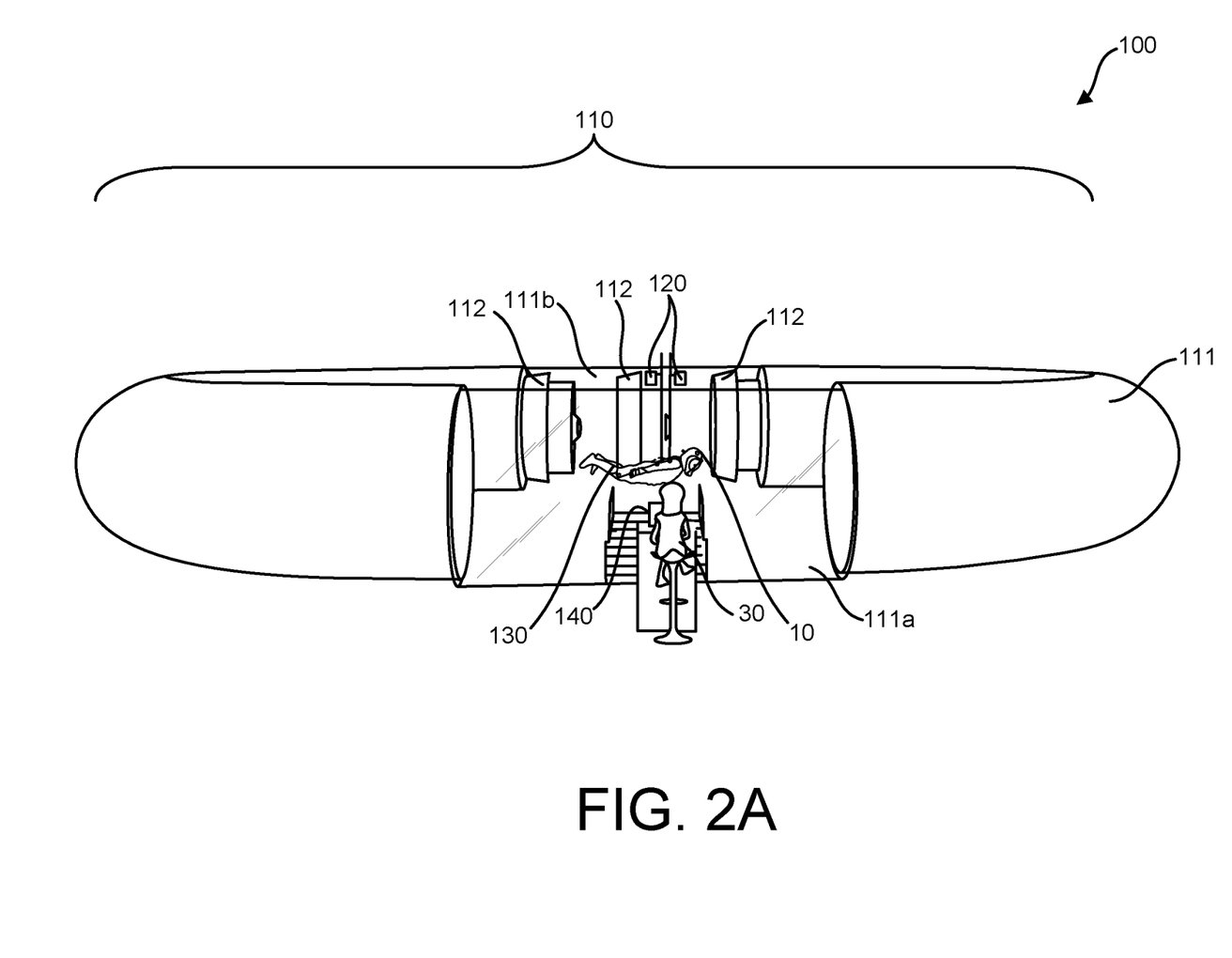
FIG. 2A illustrates a side perspective view of the virtual reality haptic feedback system, according to an exemplary embodiment of the present general inventive concept.

FIG. 2A illustrates a side perspective view of the virtual reality haptic feedback system 100, according to an exemplary embodiment of the present general inventive concept.

Figure 2B:
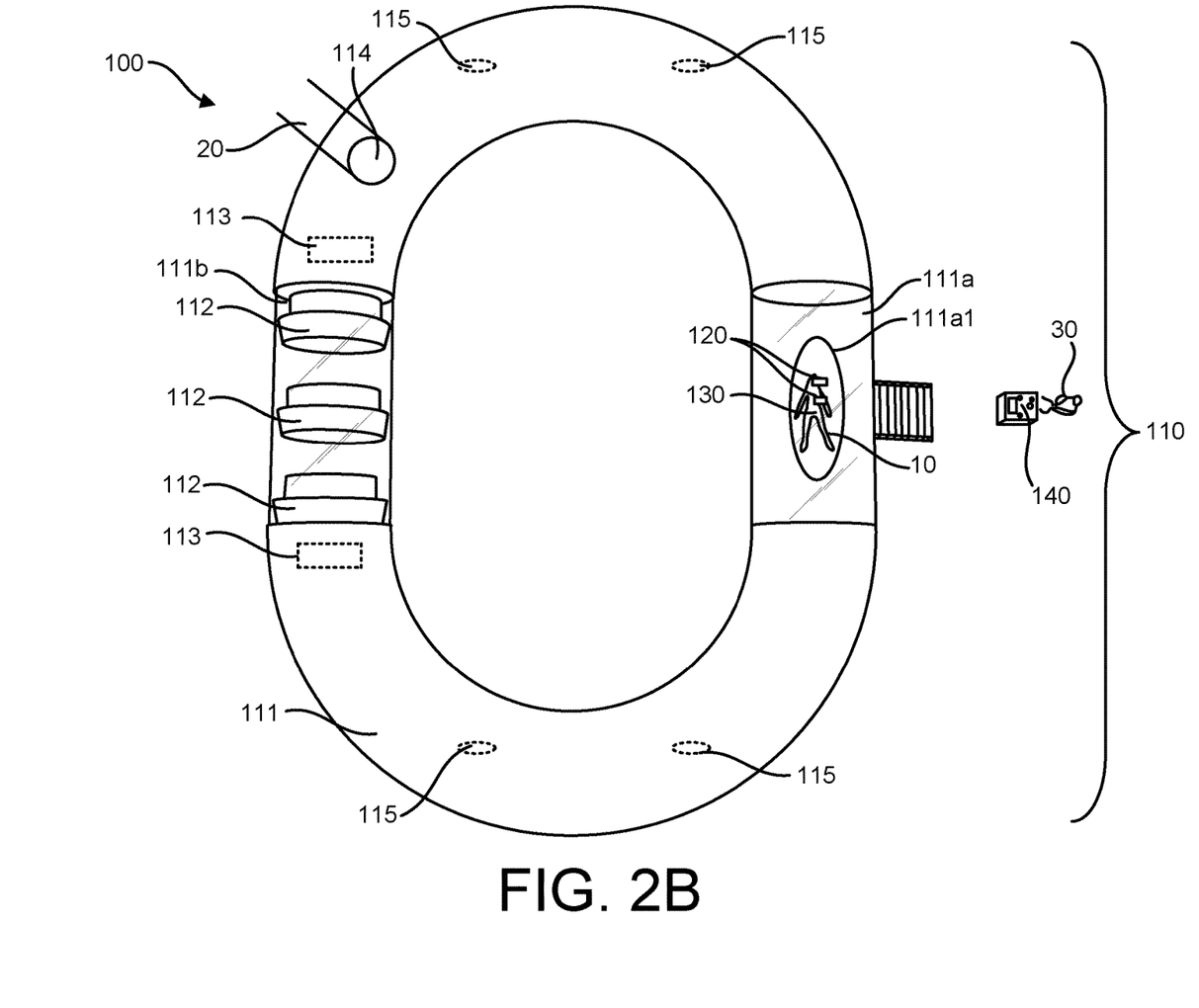
FIG. 2B illustrates a top view of the virtual reality haptic feedback system, according to an exemplary embodiment of the present general inventive concept.

FIG. 2B illustrates a top view of the virtual reality haptic feedback system 100, according to an exemplary embodiment of the present general inventive concept.

The chamber 110 may include a main body 111, a plurality of turbines 112, a plurality of entrapment members 113, a fluid door 114, and a plurality of lights 115, but is not limited thereto.

Referring to FIGS. 2A and 2B, the main body 111 is illustrated to have an oval shape. However, the main body 111 may be a rectangular prism, conical, circular, pentagonal, hexagonal, octagonal, or any other shape known to one of ordinary skill in the art, but is not limited thereto.

The main body 111 may include an entry portion 111a and a turbine portion 111b, but is not limited thereto.

The entry portion 111a may include an entry door 111a1, but is not limited thereto.

The main body 111 may be substantially tubular. The entry door 111a1 may be pivotally disposed on at least a portion of the entry portion 111a. For example, the entry door 111a1 may be moved, such that a user 10 may enter the main body 111 via the entry door 111a1.

The plurality of turbines 112 may be disposed within at least an interior portion of the main body 111. Specifically, the plurality of turbines 112 may be disposed within the turbine portion 111b of the main body 111.

The plurality of entrapment members 113 may include a gate, a wall, and/or a door, but is not limited thereto. The plurality of entrapment members 113 may be disposed within at least the interior portion of the main body 111, such that the plurality of entrapment members 113 may surround each side of the turbine portion 111b.

The fluid door 114 may be removably disposed on at least a portion of the main body 111. Specifically, the fluid door 114 may be removably disposed on at least a portion of a top surface of the main body 111. The fluid door 114 may be removed to connect an external hose 20 thereto. Moreover, the fluid door 114 may receive water therethrough to at least partially fill the main body 111 with the water via the external hose 20.

However, the main body 111 may remain at least partially empty to facilitate entry of the user within the entry portion 111a. Subsequently, the water may be dispensed in the main body 111, such that the main body 111 may be substantially full of the water in response to the user 10 being contained therein. As such, the user 10 may be suspended within the water as stored within the main body 111.

The plurality of lights 115 may be disposed within at least a portion of the interior portion of the main body 111 to illuminate the interior portion of the main body 111.

The movement system 120 may include a first extension device 121, a second extension device 122, a third extension device 123, and a fourth extension device 124, but is not limited thereto.

The first extension device 121 may include a first controller 121a, a first piston 121b, and a first ball joint 121c, but is not limited thereto.

The second extension device 122 may include a second controller 122a, a second piston 122b, and a second ball joint 122c, but is not limited thereto.

The third extension device 123 may include a third controller 123a, a third piston 123b, and a third ball joint 123c, but is not limited thereto.

The fourth extension device 124 may include a fourth controller 124a, a fourth piston 124b, and a fourth ball joint 124c, but is not limited thereto.

The first controller 121a, the second controller 122a, the third controller 123a, and the fourth controller 124a may each include a processing unit, a communication unit, and a motor, but is not limited thereto. The processing unit (or central processing unit, CPU) may include electronic circuitry to carry out instructions of a computer program by performing basic arithmetic, logical, control and input/output (I/O) operations specified by the instructions. The processing unit may include an arithmetic logic unit (ALU) that performs arithmetic and logic operations, processor registers that supply operands to the ALU and store the results of ALU operations, and a control unit that fetches instructions from memory and "executes" them by directing the coordinated operations of the ALU, registers and other components. The processing unit may also include a microprocessor and a microcontroller. The communication unit may include a device capable of wireless or wired communication between other wireless or wired devices via at least one of Wi-Fi, Wi-Fi Direct, infrared (IR) wireless communication, satellite communication, broadcast radio communication, Microwave radio communication, Bluetooth, Bluetooth Low Energy (BLE), Zigbee, near field communication (NFC), and radio frequency (RF) communication, USB, Firewire, and Ethernet.

The first controller 121a may be disposed on at least a portion of a top surface of the entry portion 111a. Similarly, the second controller 122a, the third controller 123a, and the fourth controller 124a may be disposed on at least a portion of the top surface of the entry portion 111a.

The first piston 121b may be disposed on the wearable haptic feedback device 130 at a first end and disposed on at least a portion of the first controller 121a at a second end thereof. The second piston 122b may be disposed on the wearable haptic feedback device 130 at a first end and disposed on at least a portion of the second controller 122a at a second end thereof. The third piston 123b may be disposed on the wearable haptic feedback device 130 at a first end and disposed on at least a portion of the third controller 123a at a second end thereof. The fourth piston 124b may be disposed on the wearable haptic feedback device 130 at a first end and disposed on at least a portion of the fourth controller 124a at a second end thereof. Furthermore, the first piston 121b, the second piston 122b, the third piston 123b, and/or the fourth piston 124b may extend away from the first controller 121a, the second controller 122a, the third controller 123a, and/or the fourth controller 124a, respectively, a predetermined distance within at least a portion of the entry portion 111a.

Additionally, each piston may move telescopically with respect to each controller. As such, a length of each piston may reduce in response to rotation of the motor in a first direction within each controller. Conversely, the length of each piston may increase in response to rotation of the motor in a second direction within each controller. As such, the wearable haptic feedback device 130 may move in a first vertical direction (i.e. toward the top surface of the entry portion 111a) or a second vertical direction (i.e. away from the top surface of the entry portion 111a) in response to movement of the first piston 121b, the second piston 122b, the third piston 123b, and/or the fourth piston 124b.

The first ball joint 121c, the second ball joint 122c, the third ball joint 123c, and the fourth ball joint 124c may be disposed on the first end of the first piston 121b, the second piston 122b, the third piston 123b, and the fourth piston 124b, respectively. Each ball joint may rotate in any lateral direction in response to rotation of the motor within each controller. For example, the wearable haptic feedback device 130 may move to be oriented at an angle with respect to the top surface of the entry portion 111a, such that the user 10 may be tilted.

Figure 3:
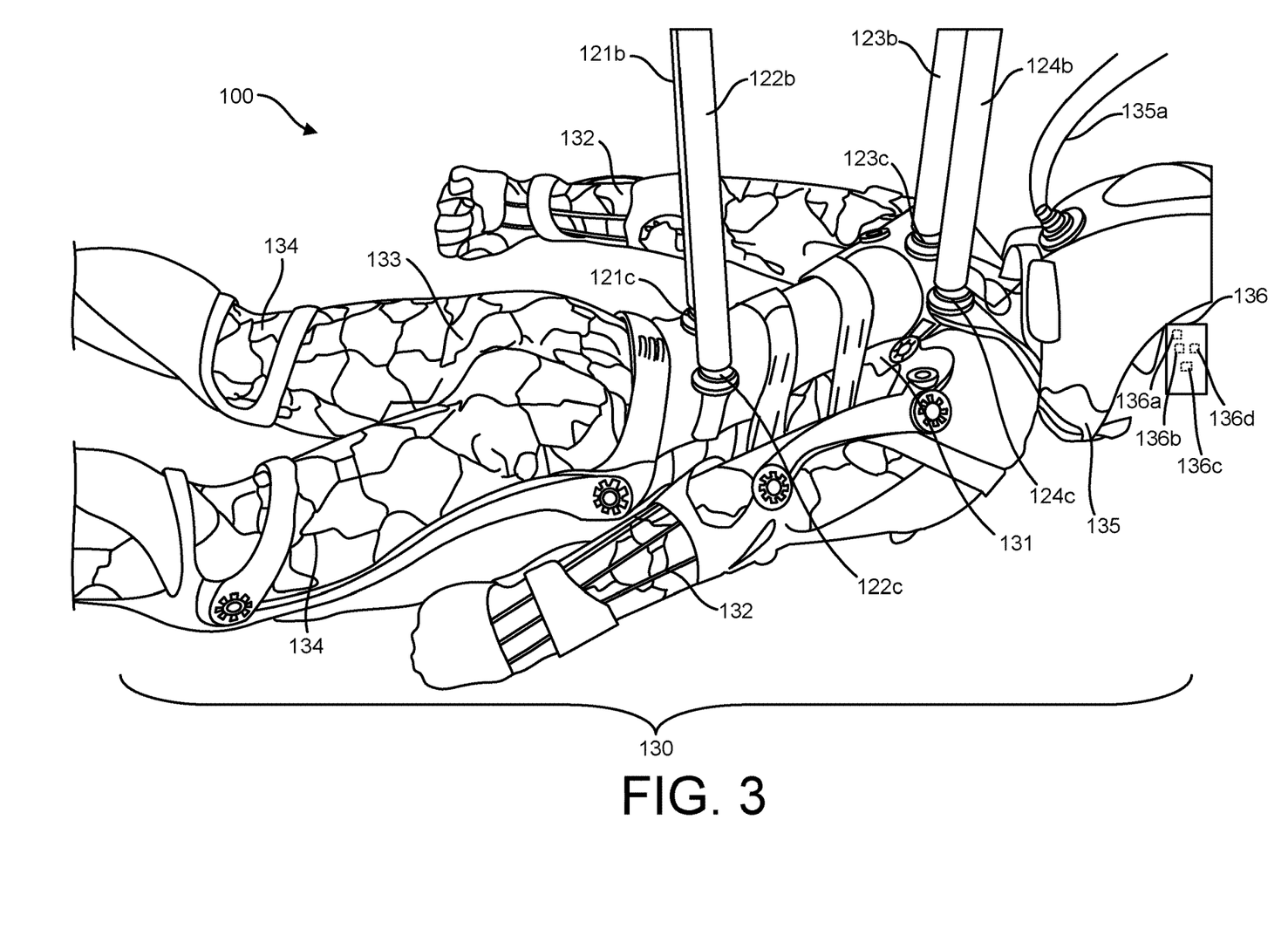
FIG. 3 illustrates a top view of a wearable haptic feedback device disposed on a movement system, according to an exemplary embodiment of the present general inventive concept.

FIG. 3 illustrates a top view of a wearable haptic feedback device 130 disposed on a movement system 120, according to an exemplary embodiment of the present general inventive concept.

Figure 4:
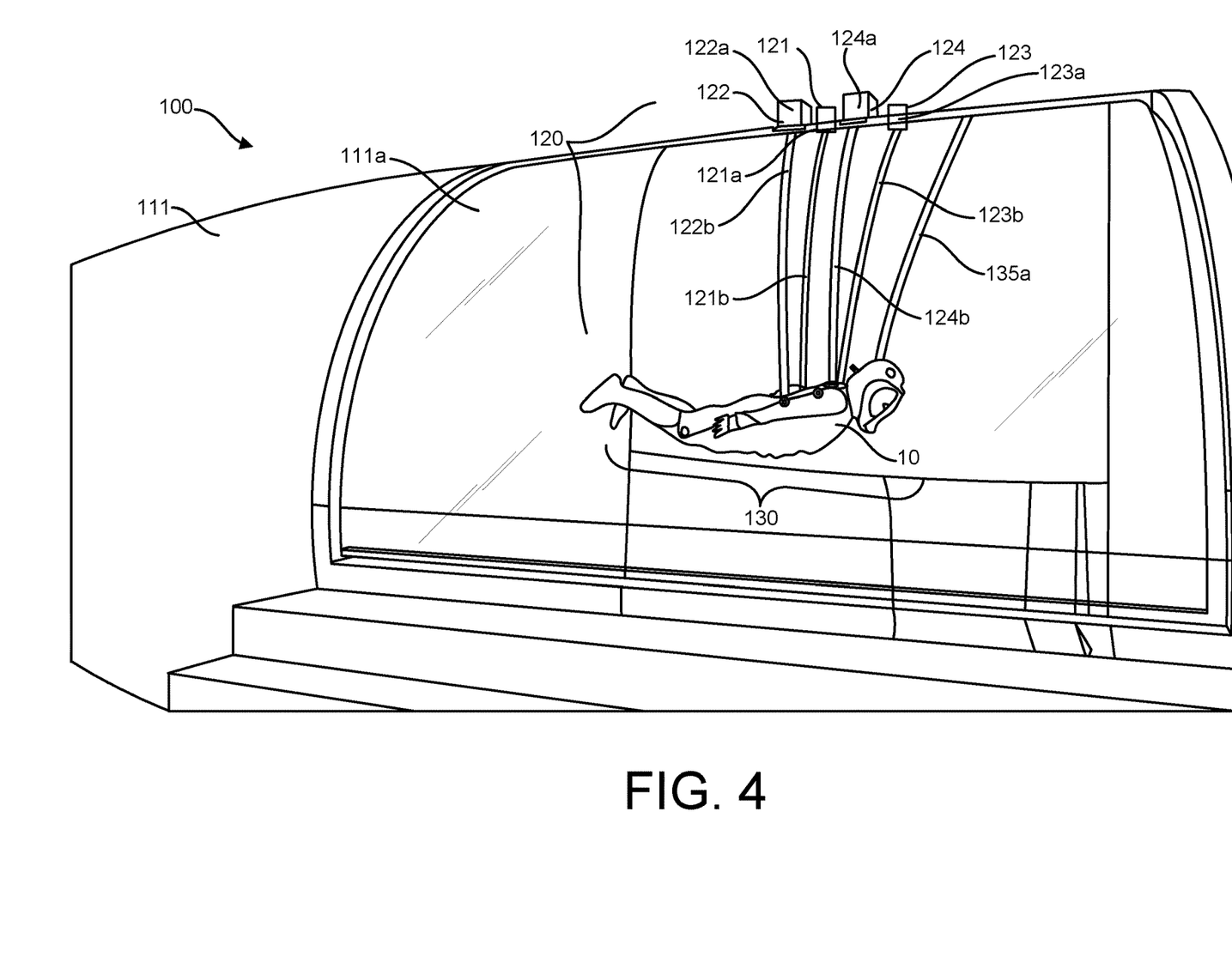
FIG. 4 illustrates a zoomed in view of the virtual reality haptic feedback system, according to an exemplary embodiment of the present general inventive concept.

FIG. 4 illustrates a zoomed in view of the virtual reality haptic feedback system 100, according to an exemplary embodiment of the present general inventive concept.

The wearable haptic feedback device 130 may be constructed from fabric, cloth, rubber, latex, leather, plastic, yarn, thread, metal, wood, wool, polyester, polyurethane, silk, satin, velvet, velour, SPANDEX, LYCRA, etc., but is not limited thereto. As such, if the wearable haptic feedback device 130 is constructed from a stretchable material, the wearable haptic feedback device 130 may be form-fitted for wearers of various shapes and sizes. The wearable haptic feedback device 130 may be waterproof.

The wearable haptic feedback device 130 may include a torso portion 131, a plurality of arm portions 132, a pelvic portion 133, a plurality of leg portions 134, a helmet 135, and a helmet controller 136, but is not limited thereto.

Additionally, the torso portion 131, the plurality of arm portions 132, the pelvic portion 133, the plurality of leg portions 134, and/or the helmet 135 may include vibration devices, pistons, mechanical rollers, compression devices, stretching devices, kneading devices, pressing devices, oscillators, gears, etc. As such, the wearable haptic feedback device 130 may provide a pressured sensation to various body parts of the user 10, thus simulating an encounter with an object and/or a haptic experience.

In other words, the haptic experience may include kinesthetic communication or 3D touch that applies forces, vibrations, or motions to the user 10.

The torso portion 131 may cover a chest, torso, and/or back of the user 10.

Each of the plurality of arm portions 132 may cover an arm, a hand, and/or a shoulder of the user 10.

The pelvic portion 133 may cover a waist, hip, crotch and/or buttocks of the user.

Each of the plurality of leg portions 134 may cover an entire leg, a knee, and/or a foot of the user.

The helmet 135 may include an air tube 135a, but is not limited thereto.

The air tube 135a may be disposed on and/or within at least a portion of the helmet 135. The air tube 135a may extend away from the helmet 135 at a first end to at least through the top surface of the entry portion 111a at a second end thereof, such that the air tube 135 at least partially protrudes on an outer portion of the entry portion 111a. In other words, the air tube 135a may facilitate breathing for the user 10 while the user 10 is submerged under the water in the main body 111.

Alternatively, the air tube 135a may be an air storage unit 135a worn on at least a portion of the wearable haptic feedback device 130. In other words, the air storage unit 135a may have no connection to the outer portion of the entry portion 111a. For example, the air storage unit 135a may be an air tank. Moreover, the air storage unit 135a may facilitate breathing for the user 10 while the user 10 is submerged under the water in the main body 111.

The helmet 135 may cover a head and/or a neck of the user.

The helmet controller 136 may include a processing unit 136a, a display unit 136b, a communications unit 136c, and a storage unit 136d, but is not limited thereto.

The processing unit 136a (or central processing unit, CPU) may include electronic circuitry to carry out instructions of a computer program by performing basic arithmetic, logical, control and input/output (I/O) operations specified by the instructions. The processing unit 136a may include an arithmetic logic unit (ALU) that performs arithmetic and logic operations, processor registers that supply operands to the ALU and store the results of ALU operations, and a control unit that fetches instructions from memory and "executes" them by directing the coordinated operations of the ALU, registers and other components. The processing unit 136a may also include a microprocessor and a microcontroller.

The display unit 136b may include a plasma screen, an LCD screen, a light emitting diode (LED) screen, an organic LED (OLED) screen, a computer monitor, a hologram output unit, a sound outputting unit, or any other type of device that visually or aurally displays data.

The communication unit 136c may include a device capable of wireless or wired communication between other wireless or wired devices via at least one of Wi-Fi, Wi-Fi Direct, infrared (IR) wireless communication, satellite communication, broadcast radio communication, Microwave radio communication, Bluetooth, Bluetooth Low Energy (BLE), Zigbee, near field communication (NFC), and radio frequency (RF) communication, USB, Firewire, and Ethernet.

The storage unit 136d may include a random access memory (RAM), a read-only memory (ROM), a hard disk, a flash drive, a database connected to the Internet, cloud-based storage, Internet-based storage, or any other type of storage unit.

The helmet controller 136 may be disposed on and/or within at least a portion of the helmet 135. The display unit 136b may be disposed on at least a portion of an interior surface of the helmet 135, such that at least one eye of the user 10 may view the display unit 136b. The storage unit 136d may store at least one program and/or at least one application thereon. For ease of description, the at least one program and/or the at least one application will hereinafter be referred to as an app. Moreover, the processing unit 136a may retrieve the app from the storage unit 136d to execute the app, such that the display unit 136b may provide a visual experience to the user 10.

The visual experience may include any image, picture, movie, and/or graphic based on code within the app. The visual experience may be a simulation of an alternative environment. For example, the display unit 136b may simulate a VR experience of the user 10 flying, swimming, and/or floating in space.

The control unit 140 may include an input unit 141, a display unit 142, a processing unit 143, a communication unit 144, and a storage unit 145, but is not limited thereto.

The input unit 141 may include a keyboard, a touchpad, a mouse, a trackball, a stylus, a voice recognition unit, a visual data reader, a camera, a wireless device reader, and a holographic input unit.

The display unit 142 may include a plasma screen, an LCD screen, a light emitting diode (LED) screen, an organic LED (OLED) screen, a computer monitor, a hologram output unit, a sound outputting unit, or any other type of device that visually or aurally displays data.

Also, the display unit 142 may be combined with the input unit 141 to be a touch-screen.

The processing unit 143 (or central processing unit, CPU) may include electronic circuitry to carry out instructions of a computer program by performing basic arithmetic, logical, control and input/output (I/O) operations specified by the instructions. The processing unit 143 may include an arithmetic logic unit (ALU) that performs arithmetic and logic operations, processor registers that supply operands to the ALU and store the results of ALU operations, and a control unit that fetches instructions from memory and "executes" them by directing the coordinated operations of the ALU, registers and other components. The processing unit 143 may also include a microprocessor and a microcontroller.

The communication unit 144 may include a device capable of wireless or wired communication between other wireless or wired devices via at least one of Wi-Fi, Wi-Fi Direct, infrared (IR) wireless communication, satellite communication, broadcast radio communication, Microwave radio communication, Bluetooth, Bluetooth Low Energy (BLE), Zigbee, near field communication (NFC), and radio frequency (RF) communication, USB, Firewire, and Ethernet.

The storage unit 145 may include a random access memory (RAM), a read-only memory (ROM), a hard disk, a flash drive, a database connected to the Internet, cloud-based storage, Internet-based storage, or any other type of storage unit.

The control unit 140 may access the Internet via the communication unit 144 to allow the user to access a website and/or the app, as described above, to be executed using the processing unit 143. The app may be downloaded from the Internet to be stored on the storage unit 145. The processing unit 143 may retrieve the app from the storage unit 145 and send an upload command to the communication unit 144 to upload the app to the communication unit 136c of the helmet controller 136. The communication unit 136c may send the app to the processing unit 136a. The processing unit 136a may store the app on the storage unit 136d. As such, the control unit 140 via the app may be synchronized with the helmet controller 136 via the app.

Alternatively, the control unit 140 may render and/or execute the app to be streamed over the communication unit 144 and the communication unit 136c instead of the processing unit 136a of the helmet controller 136 storing the app on the storage unit 136d. However, the processing unit 136a may send a display command to the display unit 136b to render the image, the picture, and/or the graphic based on the code within the app.

Prior to the user 10 entering the entry portion 111a of the main body 111, the wearable haptic feedback device 120 may be removably connected to the first extension device 121, the second extension device 122, the third extension device 123, and/or the fourth extension device 124. Subsequent to the user 10 entering the entry portion 111a, the entry door 111a1 may be closed.

An operator 30 may view the display unit 142 and input via the input unit 141 to execute the app. Specifically, the processing unit 143 may execute the app in response to the input from the operator 30, such that the chamber 110, the movement system 120, and/or the wearable haptic feedback device 130 may simulate the VR experience. In other words, the control unit 140 may control the app and/or other VR experiences encountered by the user 10. The operator 30 may use the input to modify and/or add additional content to the VR experience of the user 10. For example, the operator 30 may add a parachute to the VR experience of the user during flight in the simulation, a floating mat to the VR experience of the user during swimming in the simulation, or a space suit to the VR experience of the user during floating in space in the simulation.

Additionally, the processing unit 143 may send movement commands to the communication unit 144. The communication unit 144 may send the movement commands to the communication unit of the first controller 121a, the second controller 122a, the third controller 123a, and/or the fourth controller 124a, such that at least one of the first piston 121b, the second piston 122b, the third piston 123b, the fourth piston 124b, the first ball joint 121c, the second ball joint 122c, the third ball joint 123c, and the fourth ball joint 124c may move in response to rotation of the motor of the first controller 121a, the second controller 122a, the third controller 123a, and/or the fourth controller 124a, respectively. As such, the processing unit 143 via the app may move the movement system 120, such that the wearable haptic feedback device 130 and the user 10 move in response thereto.

Referring to FIG. 2B, during execution of the app, the plurality of turbines 112 may rotate, such that the water within the main body 111 may flow at least partially in a first lateral direction (i.e. clockwise) or a second lateral direction (i.e. counterclockwise) with respect to the top view of the main body 111. In other words, the water may flow within the main body 111, such that the user 10 may experience weightlessness, such that the user 10 may enjoy the simulation from the control unit 140 and/or the helmet controller 136 via the app. Furthermore, the water within the main body 111 may flow at different speeds depending on the simulation and a current VR experience of the user 10. For example, the plurality of turbines 112 may increase in speed in response to the simulation in the display unit 136b of the helmet controller 136 showing rapid flight, rapid free fall, fast swimming, and/or using compressed air to move through space. Alternatively, the plurality of turbines 112 may decrease in speed in response to the simulation in the display unit 136 of the helmet controller 136 displaying a VR parachute experience, slow swimming, and/or using compressed air to slow movement through space. In other words, the plurality of turbines 112 may adjust speed in response to the simulation for the VR experience of the user 10. As such, the speed of the flow of the water against the user 10 may feel different depending on an environment of the simulation (e.g., flight, water, or space).

Although, the plurality of entrapment members 113 may permit the water to flow therethrough, the plurality of entrapment members 113 may prevent the user 10 from injury, in an unlikely event of the wearable haptic feedback device 130 being disconnected from the movement system 120, and the user 10 being pushed by the water toward the plurality of turbines 112.

Therefore, the virtual reality haptic feedback system 100 may provide the user 10 with a unique simulated experience similar to flying, swimming, and/or being in space.

The present general inventive concept may include a virtual reality haptic feedback system 100 to simulate a virtual reality experience for a user 10, the virtual reality haptic feedback system 100 may include a chamber 110 to receive the user 10 therein, a wearable haptic feedback device 130 to be worn by the user 10 to provide a haptic experience to at least a portion of a body of the user 10, and a movement system 120 having a first portion connected to at least a portion of the chamber 110 and removably connected to the wearable haptic feedback device 130 at a second portion to move the wearable haptic feedback device 130 in response to the simulation.

The chamber 110 may include a main body 111 to store water therein, and a plurality of turbines 112 to move the water in a first lateral direction or a second lateral direction based on the simulation.

The chamber 110 may further include a plurality of entrapment members 113 to prevent the user from contacting the plurality of turbines 112.

The main body 111 may be substantially oval shaped.

A speed of flow of the water in the main body 111 may increase or decrease in response to a speed of rotation of the plurality of turbines 112.

The wearable haptic feedback device 130 may include an air tube 135a disposed on at least a portion of the wearable haptic feedback device 130 to facilitate breathing under the water in the main body 111.

The wearable haptic feedback device 130 may include a helmet controller 136 disposed on or within at least a portion of the wearable haptic feedback device 130 to display the virtual reality experience to at least one eye of the user 130.

The movement system 120 may include at least one extension device, including a piston that telescopically reduces in length in a first direction and increases in length in a second direction, a ball joint disposed on a first end of the piston to at least partially rotate at an angle with respect to the chamber 110, such that the wearable haptic feedback device 130 tilts in response to the rotation of the ball joint, and a controller disposed on at least a portion of an outer surface of the chamber 110 at a second end of the piston to move at least one of the piston and the ball joint in response to the simulation.

The wearable haptic feedback device 130 may be suspended by the piston in response to the user entering the chamber 110.

The virtual reality haptic feedback system 100 may further include a control unit 140 via an app that manipulates the simulation of the virtual reality experience for the user 10.

The movement system 120 may at least partially move in response to at least one command from the control unit 140.

The haptic experience may be a pressured sensation to the user 10.

The present general inventive concept may also include a virtual reality haptic feedback system 100 to simulate a virtual reality experience for a user 10, the virtual reality haptic feedback system 100 may include a chamber 110 to receive the user 10 therein, a processor 143 to generate the simulation of the virtual reality experience, and a wearable haptic feedback device 130 to be worn by the user 10 to receive the generated simulation from the processor 143 and provide at least one of a visual experience and a haptic experience for the user 10 based on the received simulation.

The virtual reality haptic feedback system 100 may further include a movement system 120 having a first portion connected to at least a portion of the chamber 110 and removably connected to the wearable haptic feedback device 130 at a second portion to move the wearable haptic feedback device 130 in response to the simulation.

The movement system 120 may move the wearable haptic feedback device 130 in at least one of at least one vertical direction and at least one titled direction in response to the simulation.

The chamber 110 may be oval shaped, and water stored therein may provide a haptic experience.

The simulation may be based on a flow of the water and movement by the movement system 120.

Figure 5:
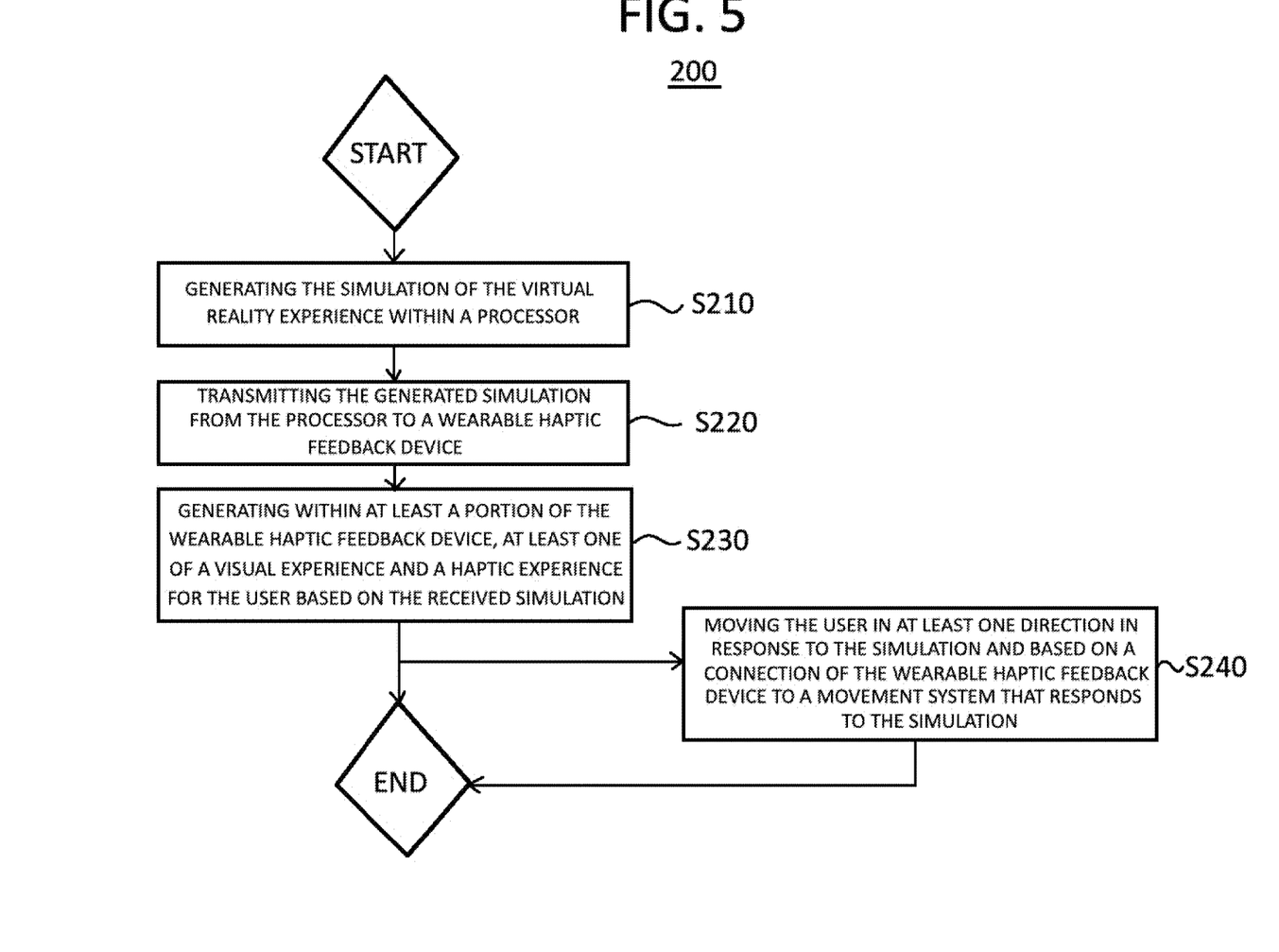
FIG. 5 illustrates a method of simulating a virtual reality experience for a user disposed within at least a portion of a virtual reality haptic feedback system, according to another embodiment of the present general inventive concept.

FIG. 5 illustrates a method 200 of simulating a virtual reality experience for a user 10 disposed within at least a portion of a virtual reality haptic feedback system 100, according to another embodiment of the present general inventive concept.

The present general inventive concept may also include a method 200 of simulating a virtual reality experience for a user 10 disposed within at least a portion of a virtual reality haptic feedback system 100, the method 200 may include generating the simulation of the virtual reality experience within a processor 143 (operation S210), transmitting the generated simulation from the processor 143 to a wearable haptic feedback device 130 (operation S220), and generating within at least a portion of the wearable haptic feedback device 130 (operation S230), at least one of a visual experience and a haptic experience for the user 10 based on the received simulation.

The method 200 may further include moving the user 10 in at least one direction in response to the simulation and based on a connection of the wearable haptic feedback device 130 to a movement system 120 that responds to the simulation (operation S240).

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

The invention claimed is:

1. A virtual reality haptic feedback system to simulate a virtual reality experience for a user, the virtual reality haptic feedback system comprising:
   a chamber to receive the user therein, the chamber comprising:
      a main body to store water therein, and
      a plurality of turbines to move the water in a first lateral direction or a second lateral direction based on the simulation;
   a wearable haptic feedback device to be worn by the user to provide a haptic experience to at least a portion of a body of the user; and
   a movement system having a first portion connected to at least a portion of the chamber and removably connected to the wearable haptic feedback device at a second portion to move the wearable haptic feedback device in response to the simulation.

2. The virtual reality haptic feedback system of claim 1, wherein the chamber further comprises:
   a plurality of entrapment members to prevent the user from contacting the plurality of turbines.

3. The virtual reality haptic feedback system of claim 1, wherein the main body is substantially oval shaped.

4. The virtual reality haptic feedback system of claim 1, wherein a speed of flow of the water in the main body increases or decreases in response to a speed of rotation of the plurality of turbines.

5. The virtual reality haptic feedback system of claim 1, wherein the wearable haptic feedback device comprises:
    an air tube disposed on at least a portion of the wearable haptic feedback device to facilitate breathing under the water in the main body.

6. The virtual reality haptic feedback system of claim 1, wherein the wearable haptic feedback device comprises:
    a helmet controller disposed on or within at least a portion of the wearable haptic feedback device to display the virtual reality experience to at least one eye of the user.

7. The virtual reality haptic feedback system of claim 1, wherein the movement system comprises:
    at least one extension device, comprising:
        a piston that telescopically reduces in length in a first direction and increases in length in a second direction,
        a ball joint disposed on a first end of the piston to at least partially rotate at an angle with respect to the chamber, such that the wearable haptic feedback device tilts in response to the rotation of the ball joint, and
        a controller disposed on at least a portion of an outer surface of the chamber at a second end of the piston to move at least one of the piston and the ball joint in response to the simulation.

8. The virtual reality haptic feedback system of claim 7, wherein the wearable haptic feedback device is suspended by the piston in response to the user entering the chamber.

9. The virtual reality haptic feedback system of claim 1, further comprising:
    a control unit via an app that manipulates the simulation of the virtual reality experience for the user.

10. The virtual reality haptic feedback system of claim 9, wherein the movement system at least partially moves in response to at least one command from the control unit.

11. The virtual reality haptic feedback system of claim 1, wherein the haptic experience is a pressured sensation to the user.

12. A virtual reality haptic feedback system to simulate a virtual reality experience for a user, the virtual reality haptic feedback system comprising:
    a chamber to receive the user therein, such that the chamber is oval shaped, and water stored therein provides a haptic experience;
    a processor to generate the simulation of the virtual reality experience;
    a wearable haptic feedback device to be worn by the user to receive the generated simulation from the processor and provide at least one of a visual experience and the haptic experience for the user based on the received simulation; and
    a movement system having a first portion connected to at least a portion of the chamber and removably connected to the wearable haptic feedback device at a second portion to move the wearable haptic feedback device in response to the simulation.

13. The virtual reality haptic feedback system of claim 12, wherein the movement system moves the wearable haptic feedback device in at least one of at least one vertical direction and at least one titled direction in response to the simulation.

14. The virtual reality haptic feedback system of claim 12, wherein the simulation is based on a flow of the water and movement by the movement system.

15. A virtual reality haptic feedback system to simulate a virtual reality experience for a user, the virtual reality haptic feedback system comprising:
    a chamber to receive the user therein, the chamber comprising:
        a main body to store a liquid therein, and
        at least one turbine to move the liquid in a first lateral direction or a second lateral direction based on the simulation; and
    a wearable haptic feedback device to be worn by the user to provide a haptic experience to at least a portion of a body of the user; and
    a movement system having a first portion connected to at least a portion of the chamber and removably connected to the wearable haptic feedback device at a second portion to move the wearable haptic feedback device in response to the simulation.

16. The virtual reality haptic feedback system of claim 15, further comprising:
    a control unit to generate the simulation of the virtual reality experience and transmit the simulation to the wearable haptic feedback device.

17. The virtual reality haptic feedback system of claim 15, wherein the simulation is generated by at least one of the wearable haptic feedback device and a processor connected to the virtual reality haptic feedback system.

* * * * *